(12) United States Patent
Gaucher et al.

(10) Patent No.: US 11,981,295 B2
(45) Date of Patent: May 14, 2024

(54) WIPER BLADE CONNECTOR

(71) Applicant: Valeo Systèmes d'Essuyage, Le Mesnil Saint Denis (FR)

(72) Inventors: Vincent Gaucher, Le Mesnil Saint Denis (FR); Stéphane Houssat, Le Mesnil Saint Denis (FR)

(73) Assignee: VALEO SYSTÈMES D'ESSUYAGE, Le Mesnil Saint Denis (FR)

( * ) Notice: Subject to any disclaimer, the term of this patent is extended or adjusted under 35 U.S.C. 154(b) by 0 days.

(21) Appl. No.: 17/781,115

(22) PCT Filed: Nov. 29, 2020

(86) PCT No.: PCT/EP2020/083817
§ 371 (c)(1),
(2) Date: May 31, 2022

(87) PCT Pub. No.: WO2021/105492
PCT Pub. Date: Jun. 3, 2021

(65) Prior Publication Data
US 2022/0410843 A1    Dec. 29, 2022

(30) Foreign Application Priority Data

Nov. 29, 2019  (FR) ...................................... 1913450

(51) Int. Cl.
*B60S 1/38*        (2006.01)

(52) U.S. Cl.
CPC ............. *B60S 1/381* (2013.01); *B60S 1/3856* (2013.01); *B60S 1/3863* (2013.01)

(58) Field of Classification Search
CPC . B60S 1/4074; B60S 2001/408; B60S 1/3863
See application file for complete search history.

(56) References Cited

FOREIGN PATENT DOCUMENTS

| DE | 10340140 | A1 | 3/2005 |
|---|---|---|---|
| EP | 3208160 | A1 | 8/2017 |

OTHER PUBLICATIONS

DE10340140A1 (machine translation) (Year: 2005).*
EP3208160A1 (machine translation) (Year: 2017).*
International Search Report and Written Opinion in corresponding International Application No. PCT/EP2020/083817, dated Jan. 27, 2021 (9 pages).

* cited by examiner

*Primary Examiner* — Andrew A Horton
(74) *Attorney, Agent, or Firm* — Osha Bergman Watanabe & Burton LLP (57) ABSTRACT

The invention relates to a connector (10) for a wiping system (1), in particular for a motor vehicle, comprising a elongated connector body (50) which has an elongated shape and is configured to be mounted on a wiper blade (2), characterized in that the connector body (50) comprises a device for guiding at least one air flow towards a surface to be wiped (40) in order to reduce a liquid suction phenomenon.

8 Claims, 6 Drawing Sheets

WIPER BLADE CONNECTOR

TECHNICAL FIELD OF THE INVENTION

The present invention relates to the field of wiping, and more particularly to the field of wiping systems intended for motor vehicles. It relates to a connector for a wiping system, and to a wiper blade and a wiping system comprising such a connector.

PRIOR ART

Motor vehicles are commonly equipped with a wiping system comprising at least one blade for wiping a glazed surface, such as a windshield. A wiper blade is driven, via an arm, by a drive motor between two end positions. The first end position of a wiper blade can correspond to a position of the wiper blade substantially horizontal on the windshield, that is to say along the hood; this first end position will be referred to by convention as the "low position". The second end position can correspond to a substantially vertical position of the wiper blade on the windshield, along a supporting pillar of this windshield; this second end position will be referred to by convention as the "high position", as illustrated by the wiping system on the right in FIG. 2, which will be described in greater detail hereinafter. During its movement between these two end positions, the wiper blade is configured to remove water, glass cleaner product and/or dirt present on the windshield and which may hinder the driver's visibility.

When a wiping system is operated between the two end positions described above, it alternates between an upward phase, during which the wiper blade moves from its low position to its high position, and a downward phase, during which it moves from its high position to its low position.

When a wiping system is in the high position described above, it has wiped the windshield and removed the liquids and dirt that were on it, forming a zone of accumulation of liquids on the lateral surface of the windshield between the pillar and the wiper blade. In practice, at the beginning of a downward phase, there is a phenomenon of suction of said liquids accumulated laterally on the windshield. This suction phenomenon is harmful because it tends to bring the liquid back into the driver's field of vision, which can reduce the driver's visibility and ultimately can become a dangerous phenomenon.

PRESENTATION OF THE INVENTION

The object of the present invention is to propose a wiping solution capable of limiting, or even eradicating, the above-mentioned suction phenomenon.

SUMMARY OF THE INVENTION

To this end, the invention relates to a connector for a wiping system, in particular for a motor vehicle, comprising a connector body which has an elongated shape and is configured to be mounted on a wiper blade, characterized in that the connector body comprises a device for guiding at least one air flow towards a surface to be wiped in order to reduce a liquid suction phenomenon.

According to a feature of the invention, the connector body is substantially U-shaped in cross-section and has a first hood arm and a second pillar arm connected together by an upper longitudinal wall, and the device for guiding at least one air flow comprises at least one channel provided at the upper longitudinal wall and extending from an inlet positioned above the first hood arm of the connector body to an outlet positioned above the second pillar arm of the connector body.

According to a feature of the invention, the at least one channel extends in a substantially transverse direction through the upper longitudinal wall of the connector body between the inlet and the outlet.

According to a feature of the invention, the first hood arm of the connector body comprises an inlet air deflector laterally extending the connector body opposite the first hood arm, said inlet air deflector forming a surface for guiding an air flow to the inlet of the at least one channel.

According to a feature of the invention, the second pillar arm comprises a volume for guiding at least one air flow capable of guiding an air flow towards a surface to be wiped, this volume being delimited by a first outer wall and a second inner wall, the first outer wall having a height greater than the second inner wall, configured to recover an air flow exiting via the outlet of the at least one channel.

According to a feature of the invention, the connector body comprises at least one deflector arranged in the volume between the first outer wall and the second inner wall.

According to a feature of the invention, said at least one deflector is able to direct an outgoing air flow in a lateral direction with respect to the connector body.

According to a feature of the invention, the connector body comprises a plurality of channels distributed over substantially the entire length of the connector body, in particular a number of channels greater than or equal to 6, or greater than or equal to 8, and/or optionally distributed symmetrically with respect to a vertical transverse median plane.

The invention also relates to a wiper blade, in particular for a motor vehicle, comprising at least one wiper strip intended to bear against a surface to be wiped, at least one bending member configured to generate a curvature of the wiper blade, a connector as described above, and at least one main support body carrying the bending member, the wiper strip, and the connector.

The invention also relates to a motor vehicle wiping system configured to wipe a surface to be wiped and comprising a wiper blade and a drive arm connected together by a connection device, the connection device comprising a connector as described above and an adapter mounted pivotably to each other, the connector comprising a connecting block of an adapter arranged on the upper longitudinal wall of the connector body.

PRESENTATION OF THE FIGURES

These objects, features and advantages of the present invention will be set forth in detail in the following description of a particular embodiment given by way of non-limiting example in conjunction with the accompanying figures, in which.

DETAILED DESCRIPTION

In the following description, the terms "longitudinal", "transverse" and "vertical" refer to a wiping system according to the invention. The longitudinal direction corresponds to a direction of longitudinal extent of the wiping system, parallel to the length of a wiper blade of the wiping system. The transverse direction corresponds to a direction perpendicular to the longitudinal direction, so that the two longitudinal and transverse directions form a plane parallel to a windshield (or more exactly tangent to the windshield when it is not plane) on which the wiping system is intended to be positioned. By convention, this plane will be referred to as being horizontal. The vertical direction corresponds to a direction perpendicular to the two longitudinal and transverse directions, and thus to the horizontal plane, so that it is perpendicular to a windshield on which the wiping system is positioned. An orthonormal coordinate system x, y, z will be used for these three longitudinal, transverse and vertical directions, respectively. The adjectives "central" and "lateral" will be used in reference to the longitudinal direction. The adjectives "upper" or "high" and "lower" or "bottom" will be used with reference to the vertical direction.

Figure 1:
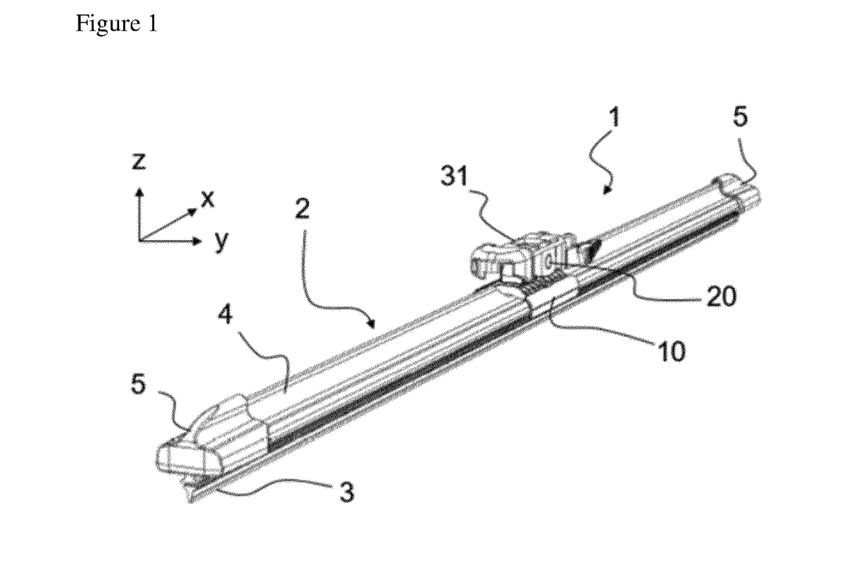
FIG. 1 is an overview of a wiping system according to one embodiment of the invention.
Figure 2:
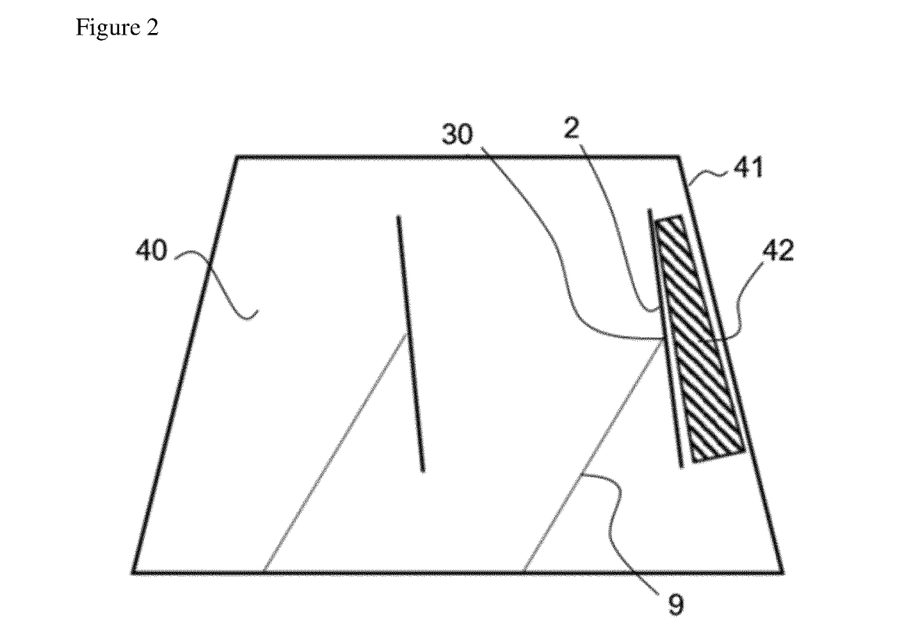
FIG. 2 schematically shows the wiping system according to the embodiment of the invention in a situation of wiping a windshield of a vehicle.

FIG. 1 illustrates in perspective a wiping system 1 according to an embodiment of the invention, comprising a wiper blade 2 and a drive arm 9, not shown in FIG. 1 but visible in FIG. 2, for connecting the wiper blade to a drive motor. According to the embodiment, the wiping system 1 is configured to be installed on a motor vehicle and to allow the removal of water, a windshield washer fluid and/or dirt, present on a surface to be wiped 40 such as a glazed surface, and more particularly a motor vehicle windshield, as illustrated by FIG. 2. For this purpose, the wiping system 1 is capable of performing an angular reciprocating motion on a windshield, as explained above. The wiping system 1 further comprises a connection device 30, capable of connecting the wiper blade 2 to a drive arm 9. The connection device 30 is arranged substantially in the center of the wiper blade 12 and provides a removable mechanical connection between an end portion of a drive arm and the wiper blade 2, and thus makes it possible for the wiper blade 2 to be separated from the drive arm in the event that said blade needs to be replaced. The connection device 30 comprises a connector 10 formed integrally with the wiper blade 2, and an adapter 31 connected by a pivot link 20 to the connector 10 and configured to be removably connected to the end portion of the drive arm 9.

In order to allow the adapter 31 to be connected to and disconnected from the end portion of the drive arm 9, the adapter 31 comprises a locking/unlocking member (not shown), which is movable between a locking position, in which the adapter 31 and the end portion are connected to each other, and an unlocking position, in which the adapter 31 and the end portion can be separated from each other.

FIG. 2 illustrates more particularly the technical problem that the invention seeks to solve. This figure thus illustrates the windshield, referred to here as 40, of a motor vehicle on which the wiper blade 2 is placed. As illustrated, this windshield 11 is bounded by at least two pillars 41 of the vehicle. During the ascending phase, the wiper blade 2 scrapes the windshield 40 so as to bring the water and/or the windshield washer fluid present on this windshield 40 towards one of the pillars 41 of the vehicle. This water and/or this windshield washer fluid then tend to accumulate in a fluid accumulation zone 42 located between the wiper blade 2 in its "high" position and this pillar 41 of the vehicle. During the downward phase of the wiper blade 2, a phenomenon of suction of these accumulated liquids by the wiper blade 2 can occur, bringing these liquids back into the driver's field of vision.

The wiping system according to the embodiment offers a solution that greatly minimizes or even eliminates this suction phenomenon by means of a device for guiding at least one air flow arranged at the connector 10 of the wiper blade 2. The function of the device for guiding at least one air flow according to the invention is to direct at least one air flow circulating on the windshield towards the device for guiding at least one air flow, to make it pass through said device and to guide it at the outlet of said guide device towards the fluid accumulation zone 42 when the wiper blade descends. This is done in order to reduce, or even reverse, the aerodynamic conditions otherwise generated downstream of the connector in relation to a direction of circulation of the air flow along the connector and which lead, on the one hand, to the accumulation of water and/or windshield washer fluid between the wiper blade in its "high" position and one of the uprights delimiting the windshield, and, on the other hand, to the re-suction of these fluids by the wiper blade, which tends to bring them back into the field of vision of a vehicle driver. Thus, the driver's visibility is optimal at all times during the wiping process.

In practice, it has been found that the suction phenomenon is particularly significant in the central part of the wiper blade 2, at the connection device 30, and the chosen solution has the advantage of expelling the fluids accumulated in this most critical zone by means of an air flow, thus enabling a clear reduction in the overall suction phenomenon.

The wiping system 1 according to the embodiment will now be described in detail. It thus comprises a wiper blade 2 that extends in the longitudinal direction, with longitudinal axis x. The wiper blade 2 comprises a wiper strip 3, at least one bending member (not shown), also called a vertebra, and two end caps 5 arranged at one each of the longitudinal ends of the wiper blade 2.

The wiper strip 3 is the piece of the wiper blade 2 that is in direct contact with the glazed surface to remove the water and/or dirt present thereon. The wiper strip 3 is for example a flexible strip made of an elastic material, such as a polymer or a rubber in particular.

The bending member is configured to generate a curvature of the wiper blade, and to act elastically on the wiper strip 3 and ensure that it is maintained in contact with a windshield in all positions of the wiping system 1 and on any shape of windshield.

Each end cap 5 is provided to hold the wiper strip 3 and the bending member together.

Lastly, the wiper blade comprises a main support body carrying the bending member and the wiper strip 3.

Optionally, the wiper blade can include at least one air deflector 4, carried by the main support body, configured to transform a pressure applied by an air flow circulating along the glazed surface into a force pressing the wiper blade 2 against the glazed surface of the motor vehicle.

Figure 3:
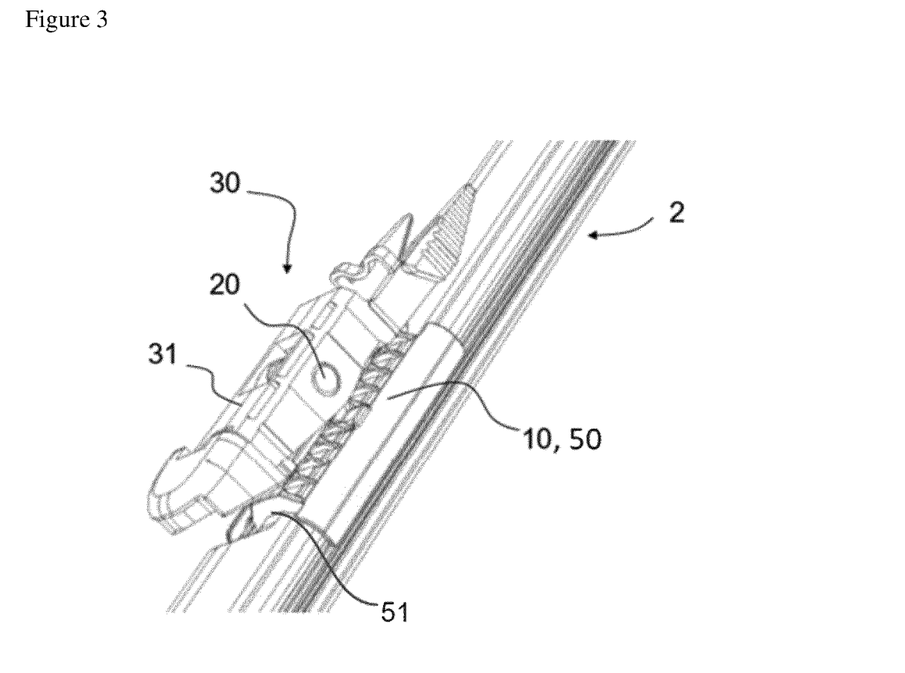
FIG. 3 is a perspective view from a first side of a connection device of the wiping system according to one embodiment of the invention.
Figure 4:
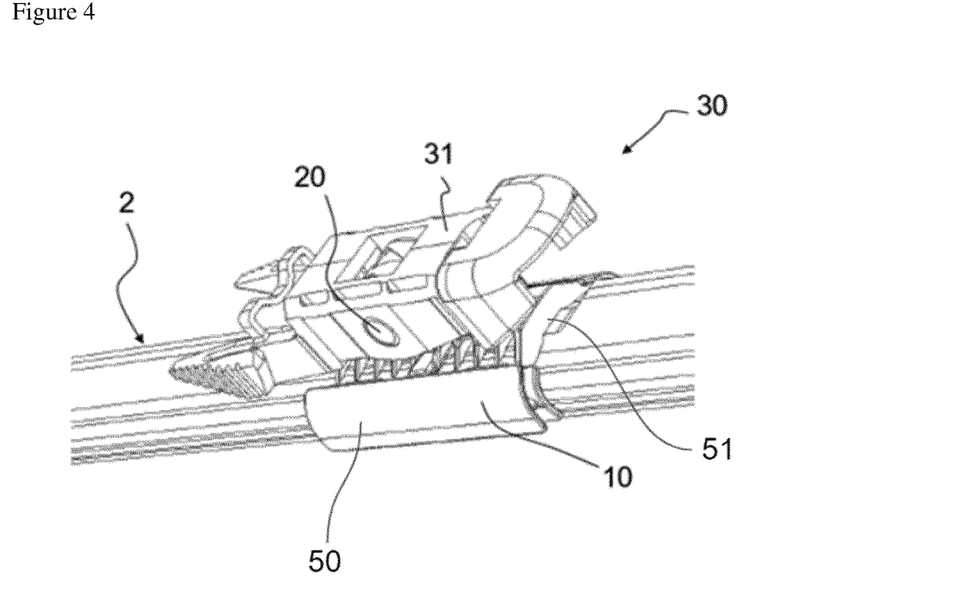
FIG. 4 is a perspective view of a second side, opposite the first side, of the connection device of the wiping system according to the embodiment of the invention.

The main support body also carries the connection device 30, as mentioned previously, more particularly visible in FIGS. 3 and 4 in which the wiper blade 2 is partially truncated to facilitate the view of the connection device.

The connector 10 of the connection device 30 comprises a connecting block 21 and a connector body 50.

The connector body 50 is attached to the wiper blade 2. It has an elongated shape and has an inverted U-shaped cross section. It extends over the bending member of the wiper blade 2 and is extended substantially vertically at its transverse ends by a first arm 11 and a second arm 12 extending towards the wiper blade.

The connector body 50 comprises two longitudinal guides 23 arranged symmetrically on the inner surfaces of the two arms 11, 12, to allow the connector 10 to be mounted on the main support body of the wiper blade 2. This main support body of the wiper blade thus extends longitudinally in the space formed by the U-shape, as shown in FIG. 1. The inner surfaces of the two arms 11, 12 thus perform a function of connecting the connector body 50 to the main support body of the wiper blade 2.

The connecting block 21 of the connector 10 extends the connector body 50 in the vertical direction V of the wiper blade and is intended to be accommodated in the adapter 31.

Lastly, the connecting block 21 comprises a hole 22 extending transversely to the connecting block 21 and being intended to cooperate with a pin 20 serving as a pivot or by the presence of a stud formed in the adapter 31 so as to allow articulation of the connector relative to the adapter. It is understood that the cooperation between the connecting block 21 and the adapter 31 could be achieved in a different way without departing from the context of the invention, and, for example, could be achieved by the presence of a stud in the connecting block intended to cooperate with an appropriate housing formed in the adapter.

The adapter 31, which is intended to be integral with a drive arm, is shaped so that it overlaps the connecting block 21 of the connector 10. The pin 20 serving as a pivot for the adapter is formed on each of its side walls to cooperate with the hole 22 of the connecting block 21 of the connector, as mentioned above, so as to form an articulation axis. Thus, the adapter 31 is mounted on the connector 10 in such a way as to maintain a degree of freedom in pivoting about this articulation axis. This degree of freedom allows the wiper blade 2 to pivot vis-à-vis the drive arm 9 and thus enables the wiper blade 2 to follow the curvature of a glazed surface to be wiped (not shown) as the wiper blade moves.

Figure 5:
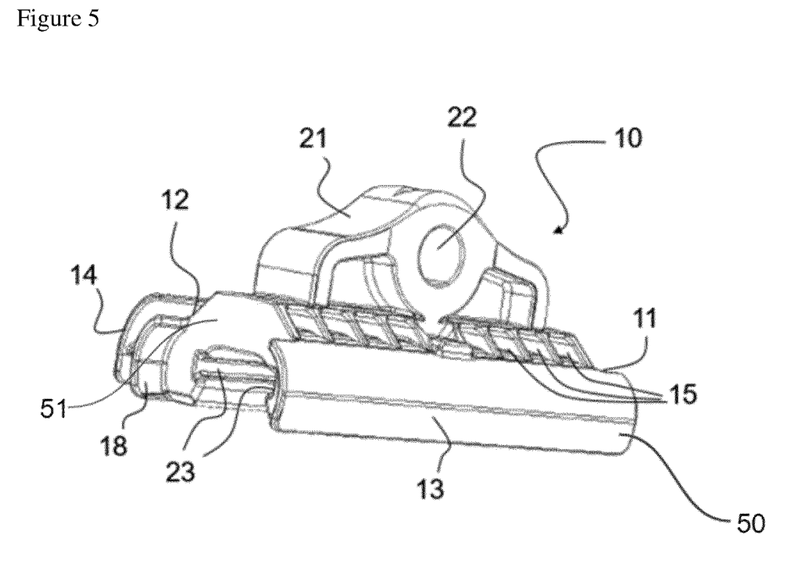
FIG. 5 is a perspective view from a first side of a connector of the connection device of the wiping system according to one embodiment of the invention.
Figure 6:
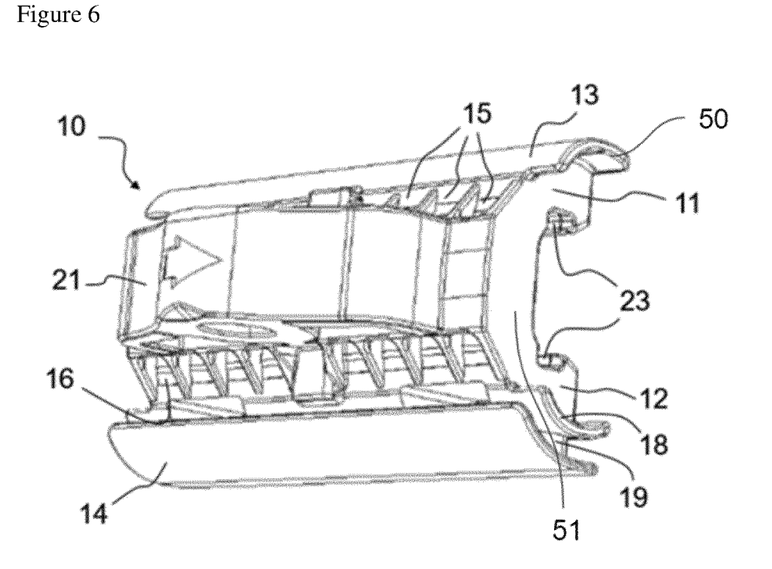
FIG. 6 is a top perspective view of the connector of the connection device of the wiping system according to the embodiment of the invention.
Figure 7:
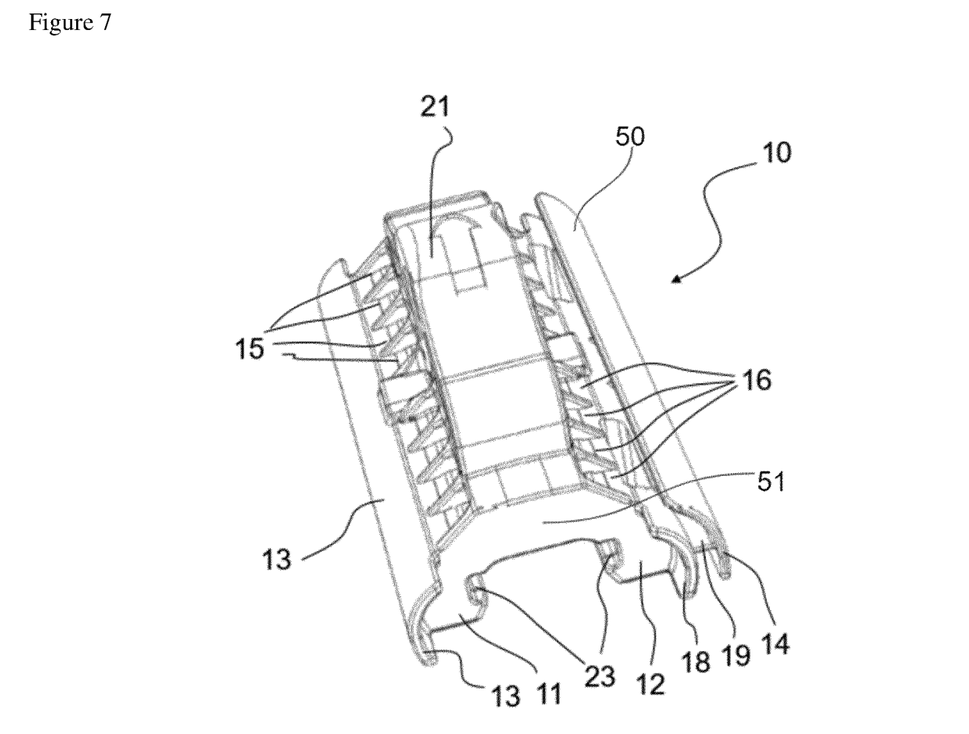
FIG. 7 is another top perspective view of the connector of the connection device of the wiping system according to the embodiment of the invention.

As previously mentioned, the connector 10 incorporates a device for reducing the suction phenomenon. More particularly, the connector 10 includes a connector body 50 comprising a device for guiding at least one air flow. The connector 10 according to the embodiment is more particularly shown in FIGS. 5 to 7. The connector body 50 is substantially U-shaped in cross-section. It comprises a first arm 11 and a second arm 12 connected together by an upper longitudinal wall 51. The first arm 11 extending downwards, particularly visible in the perspective view of FIG. 6, is located on the left side of the wiper blade 2 in FIG. 2, i.e. oriented towards the windshield 40, opposite the pillar 41. In the low position of the wiper blade, this first arm 11 is thus intended to come close to the hood of the vehicle. For this reason, this will be called by convention the first hood arm 11 of the connector 10. A second, opposite arm 12 will be called by convention the second pillar arm 12, since it is oriented towards the pillar in the high position of the wiper blade. According to the embodiment, the connector body 50 comprises a plurality of channels 25 provided in the upper longitudinal wall 51 of the connector body 50, more particularly visible in FIGS. 9 and 11, arranged substantially symmetrically with respect to at least one vertical transverse median plane, which make it possible to guide air flows towards the accumulation zone 42.

More specifically, the connector body 50 includes a convexly rounded surface at the lower outer portion of its first hood arm 11, which extends from the lower end of that first arm 11 to inlets 15 of channels 25 provided in the upper longitudinal wall of the connector body along the first hood arm 11. The shape of the rounded surface allows air flowing over the windshield to be guided to the channel inlets 15. The rounded surface thus forms an inlet air deflector 13.

The second pillar arm 12 likewise includes channel outlets 16, substantially aligned with the inlets 15 in the transverse direction. In other words, the channel outlets 16 are provided in the longitudinal wall 51 of the connector body 50 along the second pillar arm 12. It further comprises an arrangement making it possible to guide the air exiting the channels downwardly, and thus towards the windshield 40. This arrangement comprises a first outer wall 14, the top end of which is sufficient to recover the air flow exiting the channels through the outlets 16. The arrangement comprises a second inner wall 18, extending downwardly from the outlets 16 of the channels. The two inner and outer walls 18, 14 are substantially parallel and delimit a volume inside which the air is guided towards the windscreen 40. These two walls 18, 14 are joined together by spacers or deflectors 19, visible in FIGS. 6, 7, 9 and 11. The first outer wall 14 is higher than the second inner wall 18.

The air flow exiting the channel outlets 16 expels the fluids accumulated in the fluid accumulation zone 42 so as to remove them from the windshield 11, towards the windshield pillar 41, and thus limit this suction phenomenon from impairing the driver's visibility.

Figure 9:
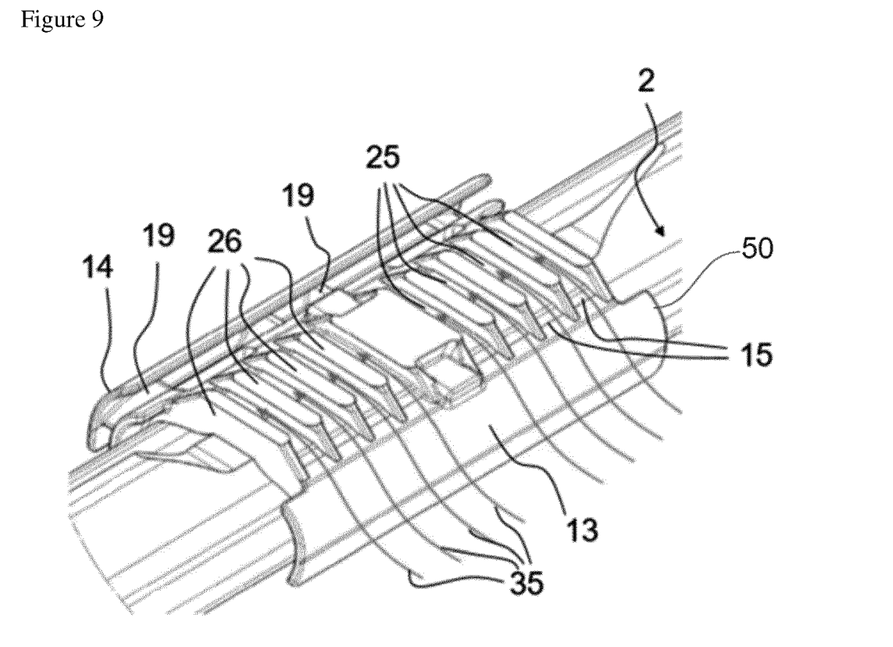
FIG. 9 is a simplified perspective view illustrating the incoming air flow at the first side of the connector of the connection device of the wiping system connection device according to the embodiment of the invention.
Figure 11:
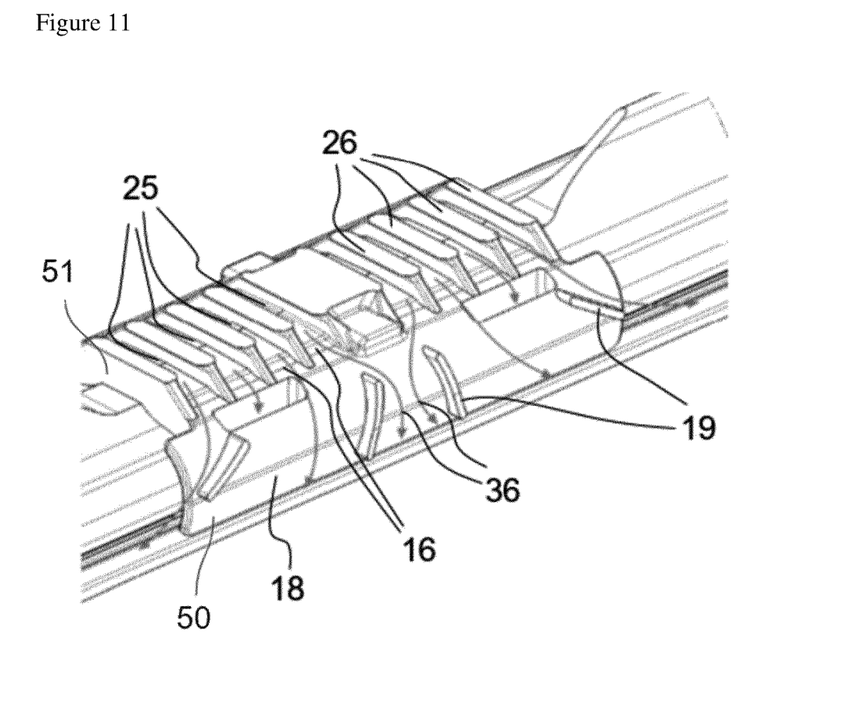
FIG. 11 is a simplified perspective view illustrating the outgoing air flow at the second side of the connector of the connection device of the wiping system according to the embodiment of the invention.

Lastly, it is apparent that the upper longitudinal wall 51 of the connector body 50, arranged at the base of the U-shape of the connector body connecting the first hood arm 11 to the second pillar arm 12, comprises channels 25, more particularly visible in the partial views of FIGS. 9 and 11. These channels 25 extend in the transverse direction between the inlets 15 and the outlets 16, as previously mentioned. These channels 25 are bounded by vertical and transverse walls 26 of the upper longitudinal wall 51 of the connector body 50. In addition, the rounded walls 13, 14, 18 complete the air flow guidance, in combination with the channels. With this design, air flows pass through the wiper blade 2 at a minimum height via the connector 10, i.e., just above the main supporting body of the wiper blade, without changing this wiper body. This makes it possible to optimize the guidance of an air flow flowing over the windshield 40 to one of the windshield pillars 41, since the air follows a path as close to the wiper blade 2 as possible, and thus moves away from the windshield 40 only to a minimum extent. It also finally results that the generated air flows pass through the connector in its transverse direction, and likewise through a connection device 30 of a wiping system through the connector, just below the adapter 31 connected to it.

FIGS. 8 to 11 more particularly illustrate the operation of the connector 10 and of the wiping system 1 according to the embodiment of the invention.

Figure 8:
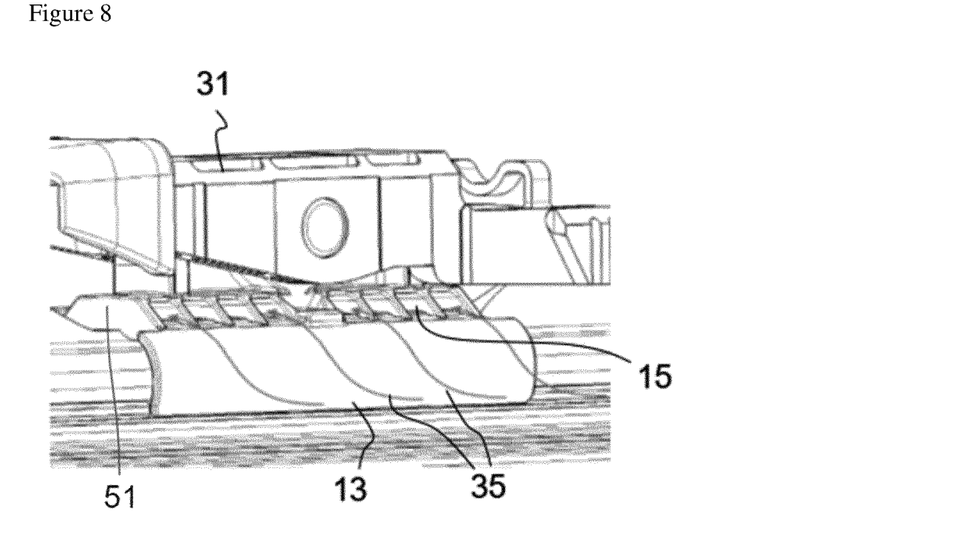
FIG. 8 is a perspective view illustrating an incoming air flow at a first side of the connection device of the wiping system according to the embodiment of the invention.

FIGS. 8 and 9 illustrate the generation of incoming air flows 35 on the side of the first hood arm 11 of the connector 10, during the descent of the wiper blade 2. Indeed, during this descent, the inlet air deflector 13 is located in the front part of the connector in its direction of movement, and thanks to its shape and its speed of movement (that of the wiper blade), it guides the air towards the inlets 15 of the channels 25, thus generating the incoming air flows 35, as illustrated in the two figures. FIG. 9 shows the connector 10 in section through a horizontal plane at the channels 25, in order to visualize in more detail the trajectory of the air flows 35, which bypass the wiper blade while remaining as close as possible to this wiper blade.

Figure 10:
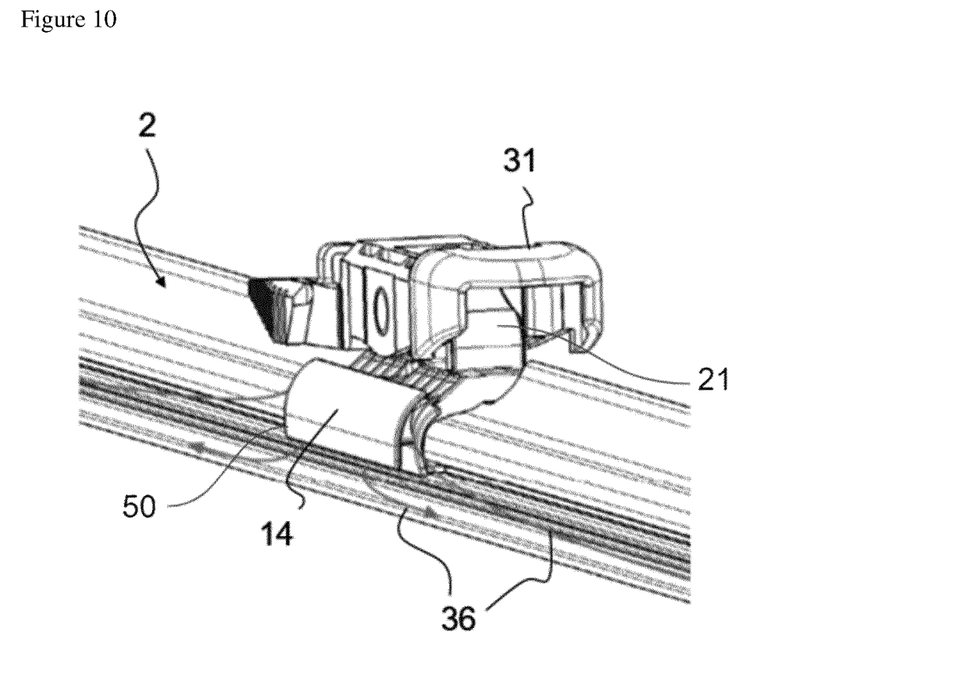
FIG. 10 is a perspective view illustrating an outgoing air flow at a second side of the connection device of the wiping system according to the embodiment of the invention.

FIGS. 10 and 11 illustrate the outgoing airflows 36 on the side of the second upright arm 12 of the connector 10, as the wiper blade 2 descends. These outgoing air flows 36 result from the incoming air flows 35. They emerge from the outlets 16 of the channels 25, in a substantially transverse direction, then are inclined downwardly by the walls 14, 18, in order to expel the fluids on the windshield, in particular in the fluid accumulation zone 42, thus reducing or preventing the suction phenomenon. Advantageously, deflectors 19 allow a second lateral orientation of certain outgoing air flows, i.e., in a direction with a non-zero longitudinal component, in order to expel the air beyond the sole length of the connector 10, and ultimately act on the fluid accumulation zone 42 over a greater length than that of the connector itself.

In other words, the air flow circulating on the windshield, entering and passing through the channels 25 of the device for guiding at least one air flow, leaves the channels to thus at least limit the aerodynamic conditions otherwise generated downstream of the connector 10 and push away the water and/or the windshield washer fluid accumulated in the fluid accumulation zone 42 defined above with reference to FIG. 2, located between the wiper blade in its "high" position and the windshield pillar 41. It is then understood that this water and/or this windshield washer fluid are pushed towards the windshield pillar 41, which moves this fluid away from the wiper blade and thus reduces the phenomenon of attraction of the wiper blade to this fluid. As a result, the driver's visibility is significantly improved and the risk of visual disturbance is reduced.

The connector 10 according to the invention has a particular shape. Advantageously, a material addition manufacturing process is used to manufacture it.

The present invention thus proposes a simple and inexpensive means of at least reducing the phenomenon of suction that can occur during the downward phases of the wiper blade and that can result in impaired driver visibility. The invention achieves its objective by proposing a connector comprising on its connector body a device for guiding at least one air flow that is configured to repel or move away a liquid from the wiper blade comprising such a connector.

Naturally, the invention is not limited to a connector according to the embodiment described. In a variant, the connector can comprise any other device for guiding at least one air flow towards the windshield, so as to reduce the suction phenomenon explained above. This device for guiding an air flow can include a number of channels different from the eight channels described. It thus comprises at least one channel, and advantageously 6 or more, even 8 or more. The channel or channels is or are advantageously distributed over substantially the entire length of the connector. In a variant, it occupies or they occupy only a portion of this length. On the other hand, the at least one channel may have an orientation other than that described. Similarly, the inlet air deflector 13, and the walls 14, 18, which form outlet air deflectors, may have geometries other than those described, to achieve a similar or equivalent effect.

It is noted that the suction phenomenon explained above increases when the speed of the vehicle increases. This phenomenon can also be amplified when the vehicle is moving into a headwind. The solution according to the invention has the advantage of guiding a flow of air towards the windshield, the flow rate of which increases when the speed of the vehicle increases and/or in case of a headwind. Thus, the solution according to the invention naturally adapts to the dynamic evolution of the suction phenomenon when a vehicle is moving, and remains effective in all driving conditions.

The invention claimed is:

1. A connector for a wiping system for a motor vehicle, comprising:
   a connector body which has an elongated shape and is configured to be mounted on a wiper blade,
   wherein the connector body comprises a device for guiding at least one air flow towards a surface to be wiped in order to reduce a liquid suction phenomenon,
   wherein the connector body is substantially U-shaped in cross-section and comprises a first connection profile and a second pillar arm connected together by an upper longitudinal wall,
   wherein the device for guiding the at least one air flow comprises at least one channel provided at the upper longitudinal wall and extending from an inlet positioned above the first connection profile of the connector body to an outlet positioned above the second pillar arm of the connector body,
   wherein the first connection profile of the connector body comprises an integrally formed inlet air deflector that laterally extends past a first longitudinal end and a second longitudinal end of the connector body, said inlet air deflector forming a surface for guiding the air flow to the inlet of the at least one channel.

2. The connector for the wiping system as claimed in claim 1, wherein the at least one channel extends in a substantially transverse direction through the upper longitudinal wall of the connector body between the inlet and the outlet.

3. The connector for the wiping system as claimed in claim 1, wherein the second pillar arm comprises a volume for guiding the at least one air flow towards the surface to be wiped, this volume being delimited by a first outer wall and a second inner wall, the first outer wall having a height greater than the second inner wall, configured to recover an air flow exiting via the outlet of the at least one channel.

4. The connector for the wiping system as claimed in claim 3, wherein the connector body comprises at least one deflector arranged in the volume between the first outer wall and the second inner wall.

5. The connector for the wiping system as claimed in claim 3, wherein said at least one deflector is able to direct an outgoing air flow in a lateral direction with respect to the connector body.

6. The connector for the wiping system as claimed in claim 1,
- wherein the device for guiding the at least one air flow comprises a plurality of channels distributed over substantially an entire length of the connector body,
- wherein the plurality of channels comprises at least eight channels, or the plurality of channels are distributed symmetrically with respect to a vertical transverse median plane.

7. A wiper blade for a wiping system for a motor vehicle, comprising:
- at least one wiper strip configured to bear against the surface to be wiped;
- at least one bending member configured to generate a curvature of the wiper blade;
- the connector as claimed in claim 1; and
- at least one main support body carrying the bending member, the wiper strip, and the connector.

8. A motor vehicle wiping system configured to wipe a surface to be wiped and comprising:
- a wiper blade; and
- a drive arm connected together by a connection device,
- the connection device comprising the connector as claimed in claim 1 and an adapter mounted pivotably to each other, and
- the connector comprising a connecting block of an adapter arranged on an upper longitudinal wall of the connector body.

* * * * *